United States Patent [19]
Farnsworth et al.

[11] Patent Number: 5,101,385
[45] Date of Patent: Mar. 31, 1992

[54] MAGNETO-OPTICAL INFORMATION STORAGE SYSTEM FOR FLEXIBLE MEDIA HAVING MAXIMUM OVERWRITE EFFICIENCY

[75] Inventors: Stephen W. Farnsworth, Berthoud; David R. Dodds, Boulder; Slobodan R. Perera, Boulder; K. John Stahl, Boulder, all of Colo.

[73] Assignee: Bernoulli Optical Systems Company, Boulder, Colo.

[21] Appl. No.: 664,529

[22] Filed: Mar. 5, 1991

Related U.S. Application Data

[63] Continuation of Ser. No. 167,659, Mar. 14, 1988, abandoned.

[51] Int. Cl.$^5$ .................. G11B 13/04; G11B 11/12
[52] U.S. Cl. .................................. 369/13; 369/14; 360/59; 360/114
[58] Field of Search .............. 369/13, 14; 360/59, 360/114, 133, 99.01

[56] References Cited

U.S. PATENT DOCUMENTS

| | | | |
|---|---|---|---|
| 4,208,681 | 6/1980 | Hatchett | 360/96.6 |
| 4,340,914 | 7/1982 | Hanaoka | 360/59 |
| 4,414,592 | 11/1983 | Losee et al. | 360/102 |
| 4,466,004 | 8/1984 | Kobayashi et al. | 360/59 |
| 4,694,358 | 9/1987 | Muchmik et al. | 369/13 |
| 4,796,241 | 1/1989 | Hayakawa et al. | 369/13 |
| 4,805,043 | 2/1989 | Doyle | 360/114 |

FOREIGN PATENT DOCUMENTS

| | | |
|---|---|---|
| 126596 | 11/1984 | European Pat. Off. . |
| 195227 | 9/1986 | European Pat. Off. . |
| 218250 | 4/1987 | European Pat. Off. . |
| 219124 | 4/1987 | European Pat. Off. . |
| 252445 | 1/1988 | European Pat. Off. . |
| 264285 | 4/1988 | European Pat. Off. . |
| 275323 | 7/1988 | European Pat. Off. . |
| 3209940 | 12/1982 | Fed. Rep. of Germany ... 360/99.01 |
| 57-78653 | 5/1982 | Japan .................. 360/59 |
| 61-148687 | 7/1986 | Japan .................. 369/13 |
| 62-248152 | 10/1987 | Japan .................. 360/114 |
| WO85/01144 | 3/1983 | PCT Int'l Appl. . |
| WO85/02933 | 7/1985 | PCT Int'l Appl. . |
| 2181879 | 4/1987 | United Kingdom . |

OTHER PUBLICATIONS

Muratomi et al., "Magnetic Head", Patent Abstract of Japan, vol. 11, No. 373 (62-143262).
Freese, "Optical Disks Become Erasable", IEEE Spectrum, pp. 41-44 (Feb. 1988).
Hiromichi et al., "New Magneto-Optic Head with a Built-In Generator for a Bias Magnetic Field", Applied Optics, vol. 27, No. 4, pp. 698-702 (Feb. 15, 1988).
Mansuripur et al., "Signal and Noise in Magneto-Optical Readout", J. Appl. Phys. vol. 53, No. 6, pp. 4485-4493 (Jun. 1982).
Tsunoda et al., "Advanced Technologies for the Next Generation Optical Disks", Publication of Hitachi, Ltd. Technical Digest Series, vol. 10.
Treves et al., "Signal, Noise and Codes in Optical Memories", Optical Engineering, vol. 25, No. 7, pp. 881-891 (Jul. 1986).
Treves et al., "Effect of Birefringence on Optical Memory Systems".

*Primary Examiner*—Stuart S. Levy
*Assistant Examiner*—Hoa Nguyen
*Attorney, Agent, or Firm*—Woodcock Washburn Kurtz Mackiewicz & Norris

[57] ABSTRACT

An information read/write storage system for reading and writing data to and from a flexible magneto-optic media is shown to include a magnetic recording member, having a recording head positioned proximate the media, for recording information onto the media at a recording point, the recording point being defined as the area of the media wherein information is being recorded at any given time and an optical read/write assembly for providing focused light onto the media during reading and writing, for receiving reflected light from the media to read the information and for continuously providing focused light onto the media for heating the recording point while the magnetic recording member is recording.

9 Claims, 4 Drawing Sheets

MAGNETO-OPTICAL INFORMATION STORAGE SYSTEM FOR FLEXIBLE MEDIA HAVING MAXIMUM OVERWRITE EFFICIENCY

This is a continuation of application Ser. No. 07/167,659, filed Mar. 14, 1988, now abandoned.

FIELD OF THE INVENTION

The present invention relates to the field of optical information storage systems and, more particularly, to information storage systems which combine magnetic and optical recording and reading techniques.

BACKGROUND OF THE INVENTION

The present emphasis in the development of information storage systems is the capability to store more and more information into a so-called "desk top" sized computer memory system. Those "desk top" sized memory systems which incorporate magnetically recorded hard disc media, such as that used in Winchester disc drive type memory systems, currently have the capacity to store upwards of 20 megabytes of magnetically recorded information. The problem with such memory systems is that by necessity the hard disc media is permanently mounted into the computer. Since the media is not easily removable, the user is limited to whatever portion of the hard disc is remaining for information storage at the time of use. Accordingly, magnetically recorded hard disc media information storage systems ar not viewed as a potential solution to increasing information storage capacity.

So-called "floppy" disc memory systems wherein flexible discs, each having a diameter of either 5.25 inches or 3.50 inches, are used as the storage media provides easily removable storage media. However, the problem with such storage systems is that the present storage capacity of information magnetically recorded on a single floppy disc used in such a system has not yet reached a level equal to that of the hard disc, i.e. a single floppy disc media can only store approximately 1 to 2 megabytes of magnetically recorded information.

Systems for storing information which can be accessed through optical devices have received significant attention due to their potential capacity to store substantially more data, i.e. on the order of 400 to 800 megabytes of information, than that available in either magnetically recorded hard disc or floppy disc storage systems. One reason for the significantly increased storage capacity of optical storage systems is that the diameter of a beam of focused light to be used to read or write information is typically only 1 micrometer (micron). Consequently the density of information stored on a media is much greater than a typical magnetic recording density. Additionally, the media for use in such optical systems can be of a form similar to that of a so-called floppy disc, that is a media which is easily removable.

Unfortunately, major problems continue to plague the development and commercial acceptance of such optical systems, namely the relative slowness by which information can be retrieved compared to magnetic storage systems, the current size restrictions of so-called "desk top" computers and the inability to write/erase and rewrite information many times on a single piece of media.

Consider the current size restrictions. So-called "desk top" computers have been provided with a number of modular components, particularly including information storage systems, which can be added into the casing of the computer to provide a certain degree of customizing to fit a particular need. Since such components can have any one of a number of sizes, the American National Standards Institute has adopted certain external standard dimensions with regard to such components, which standards are generally referred to as full-height and half-height standards. Since the half-height standard appears to be the most desirable for such modular components, a need exists to develop an optical information storage system which will fit into the half-height standard. The half-height standard for modular components is as follows: height 1.625 inches; width 5.75 inches; and depth 8.00 inches.

Present optical storage systems include those found in video disc or compact disc (CD) players, which are of the read only variety and those which are termed write once read many times (WORM) optical storage systems. Writing information onto a disc with current optical systems typically is achieved by burning the information into the media. Presently available media has not been developed where such burning can be easily erased and rewritten A hybrid of the optical and magnetic information storage systems, so called magneto-optic information storage systems appear to have the potential to not only resolve the desire for increased storage capacity but also the need to erase optical information and rewrite new optical information. It has been estimated the theoretical upper limit of the storage capacity of such systems can be as high as 300 megabytes per square inch of media. However in practice on a 5.25 inch floppy disc yields of approximately 400 to 800 megabytes can be expected.

In magneto-optic storage, data are recorded and erased on a thin film of magnetic material having properties to be described herein. Similar to magnetic recording, information is stored as a sequence of bits, where the magnetic field of the film at a given point is either north-pole-up (a digital 1) or north-pole-down (a digital zero). A blank disc has all of its magnetic poles pointing north-pole-down. The twist with magneto-optic media is that the magnetic field required to flip one magnetic domain from north-pole-down to north-pole-up, i.e. the coercive field, varies greatly with temperature. At room temperature, the coercive field necessary to achieve a north pole flip is so high that an ordinary magnet is too weak. At approximately 150° C., the coercive force required to flip a domain falls almost to zero and a bit can be recorded using known magnetic recording techniques.

Optical techniques are used in a magneto-optic system to heat selected spots on the media which is passing close to a relatively large electro-magnet. In this way, a point on the media can be heated, lowering the coercive field required to write a bit of information and the magnet, depending on its own north pole orientation, can so record the desired bit. Once the laser beam is turned off, the just heated point on the media cools "freezing" the oriented north pole to the desired orientation. To erase information so recorded, the process need only be reversed, that is the point on the media will be heated by the laser beam and the magnet's north pole orientation will be such to orient media based north poles in a down orientation.

Since it is undesirable to have any contact with the media, relatively large electromagnets were utilized.

Since such magnets are relatively slow in changing their own pole orientation according to the electrical signal being provided, poles on the media are oriented by modulating, i.e. turning on and off, the laser while the magnetic field remains relatively constant.

Reading information so recorded on a magneto-optic disc is achieved solely through optical components. A lower power light beam is focused onto the media. The reflected light is read from either above or below the media. Because of phenomena known as the Kerr magneto-optic effect and the Faraday effect light reflected from the media or passing through the media will have a slightly different polarization than the light being focused onto the media. The change in polarization will be either clockwise or counterclockwise depending on the north pole orientation at that point. For a more graphical interpretation of the above described magneto-optic operation, reference is made to Freese, Robert P., "Optical disks become erasable", IEEE Spectrum, Feb., 1988, pages 41-45.

The problem with such magneto-optic information storage systems is the ability to overwrite information without having to make two passes over the same point on the media. Until the present invention, the primary method for overwriting information in a magneto-optic system was a two step process. First, a pass was made over the media to erase all information in a given track. Second, another pass was made over the same points to now record the desired information. Since during magneto-optic recording the laser is turned on and off at a high frequency while the media is continuously moving over an electromagnet having a relatively constant magnetic field, the two step process was the primary method of assuring that no unwanted information remained on the disc after the overwrite operation was completed.

Attempts to resolve this problem included the use of two optical heads and associated electromagnets apparently arranged in a lead/lag fashion, so that the lead head can erase in the same media pass wherein information is written. Another attempt to resolve the two pass problem was the proposed use of side by side light beams focused on adjacent tracks. Still another proposal for resolving this problem was to keep laser power constant while modulating the magnetic field. This latter proposal has been rejected in Kobori, Hiromichi et al. "New magneto-optic head with a built-in generator for a bias magnetic field", Applied Optics, Vol. 27, No. 4 (Feb. 15, 1988) pages 698-702. The reason given for the rejection was that to obtain high data bit rates, the magnetic field generator (magnetic head) had to be located in close proximity to the media. Consequently it would be difficult not only to adopt a double sided disc but also to preserve disc removability.

Consequently a need still exists for a magneto-optic storage system which is capable of overwriting previously stored information with only one pass without the problems of size and access times found in other optical storage systems.

SUMMARY OF THE INVENTION

It is an object of the invention to provide a magneto-optical information storage system which is capable of overwriting onto magneto-optical media on which information has been previously stored with only one pass.

It is a further object of the invention to provide a magneto-optical information storage system having an optical head assembly of minimum weight.

It is another object of the invention to provide a magneto-optical storage system which is of a size meeting the half-height standard.

It is another object of the invention to provide a magneto-optical storage system which utilizes a flexible, media.

These and other objects are achieved in a magneto-optical information read/write storage system for reading and writing data to and from a flexible magneto-optical media, is shown to include a magnetic recording member, having a recording head positioned proximate the media, for recording information onto the media at a recording point, the recording point being defined as the area of the media wherein information is being recorded at any given time and an optical read/write assembly for providing focused light onto the media during reading and writing, for receiving reflected light from the media to read the information and for continuously providing focused light onto the media for heating the recording point while the magnetic recording member is recording.

These and other objects and advantages of the invention will become more apparent from the following detailed description when taken in conjunction with the following drawings.

DETAILED DESCRIPTION OF THE PREFERRED EMBODIMENT

Figure 1:
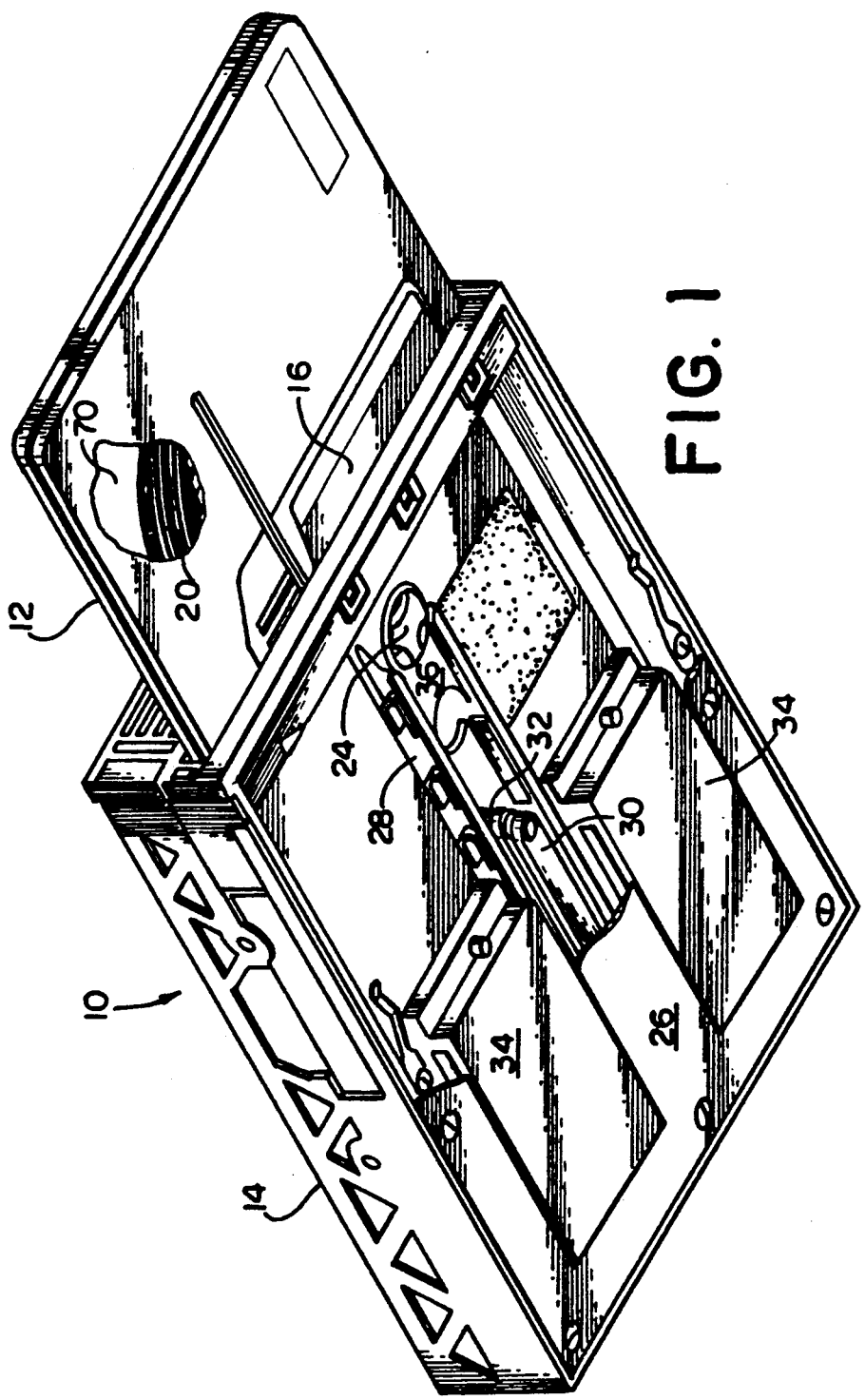
FIG. 1 is a perspective view of a magneto-optical information storage system in accordance with the principles of the present invention.

A new and novel optical information storage system constructed in accordance with the principles of the present invention is shown in FIG. 1 and generally designated 10. A cartridge 12 is shown to be partially inserted in disc drive housing 14 such that slidable cover 16 has begun to move laterally. When such lateral movement is completed, an opening 18 (shown in FIGS. 2-4) will be exposed, allowing operation upon flexible magneto-optical media disc 20.

A central hub 22 is provided in disc 20 for engagement by drive spindle 24 when cartridge 12 is fully inserted into housing 14 for rotation of disc 20. The bottom cover 26 of housing 14 is shown as being partially cut away in order to expose spicule member 28 which serves to guide both cartridge 12 during insertion and arm 30 during access of disc 20. Although not shown in complete detail in FIG. 1, a magneto-optical head assembly 32 is mounted at the distal end of arm 30. A linear actuator motor 34 serves to move arm 30 in spicule member 28 so that magneto-optical head assembly 32 is moved radially across the surface of disc 20. While several types of linear actuator motors are available for use with the invention, it is preferred that the linear actuator motor chosen be capable of providing both coarse and fine movements of arm 30 for both track-seeking and track-following by optical head assembly 32. The range of movement of arm 30 is from the retracted position shown in FIG. 1 to an extended position such that the distal end of arm 30 strikes stop 36.

The details of construction of cartridge 12, specifically its integrally formed Bernoulli surface, and its insertion and engagement by the various disc drive components described above is more fully detailed in several pending U.S. Pat. Applications, namely, Disk Drive Motor Mount - McCurtrey, et al. filed Apr. 21 1986 having Ser. No. 854,342 which is a parent case of 07/186,780, now U.S. Pat. No. 4,855,849; Disk To Spindle Engaging Device - Jones et. al., filed Apr. 21, 1986 having Ser. No. 854,333 which is a parent case of 07/238,980, now U.S. Pat. No. 4,901,173; Disk Drive with Spicule Member - Jones et. al., filed Apr. 21, 1986 having Ser. No. 854,419 now U.S. Pat. No. 4,740,851; Bernoulli Plate in Cartridge, - Jones, filed Apr. 21, 1986 having Ser. No. 854,130 now U.S. Pat. No. 4,794,480; Plural Magnetic Disc Assembly - Jones, filed Apr. 21, 1986 having Ser. No. 854,292 now U.S. Pat. No. 4,743,989; and Wipers For Pair of Stabilized Magnetic Discs - Freeman, et al., filed Feb. 27, 1987 having Ser. No. 019,872 now U.S. Pat. No. 4,769,733, which applications are incorporated herein by reference. Also incorporated by reference is patent application Disk Cartridge - Bauck, et al., filed Dec. 20, 1986 having Ser. No. 947,632 now U.S. Pat. No. 4,768,124 which application is related to U.S. Pat. No. 4,658,318 for Magnetic Disk Cartridge - Bauck issued Apr. 1, 1986. Since those applications are primarily concerned with magnetically recorded information storage systems, the media (the applications disclose the use of dual floppy discs in a single cartridge) and the means for reading and writing data from or to the media will be different. Otherwise, the structure used in those devices will be substantially identical to that which can be incorporated in an magneto-optical information storage system in accordance with the present invention. It is further assumed that one can substitute a single magneto-optical disc for the dual media shown in those applications.

A commercially available disc drive/cartridge for magnetically recording information which can be modified to provide a magneto-optic information storage system in accordance with the present invention is the Beta-20 System manufactured and sold by IOMEGA Corporation of Roy, Utah, USA.

Figure 2:
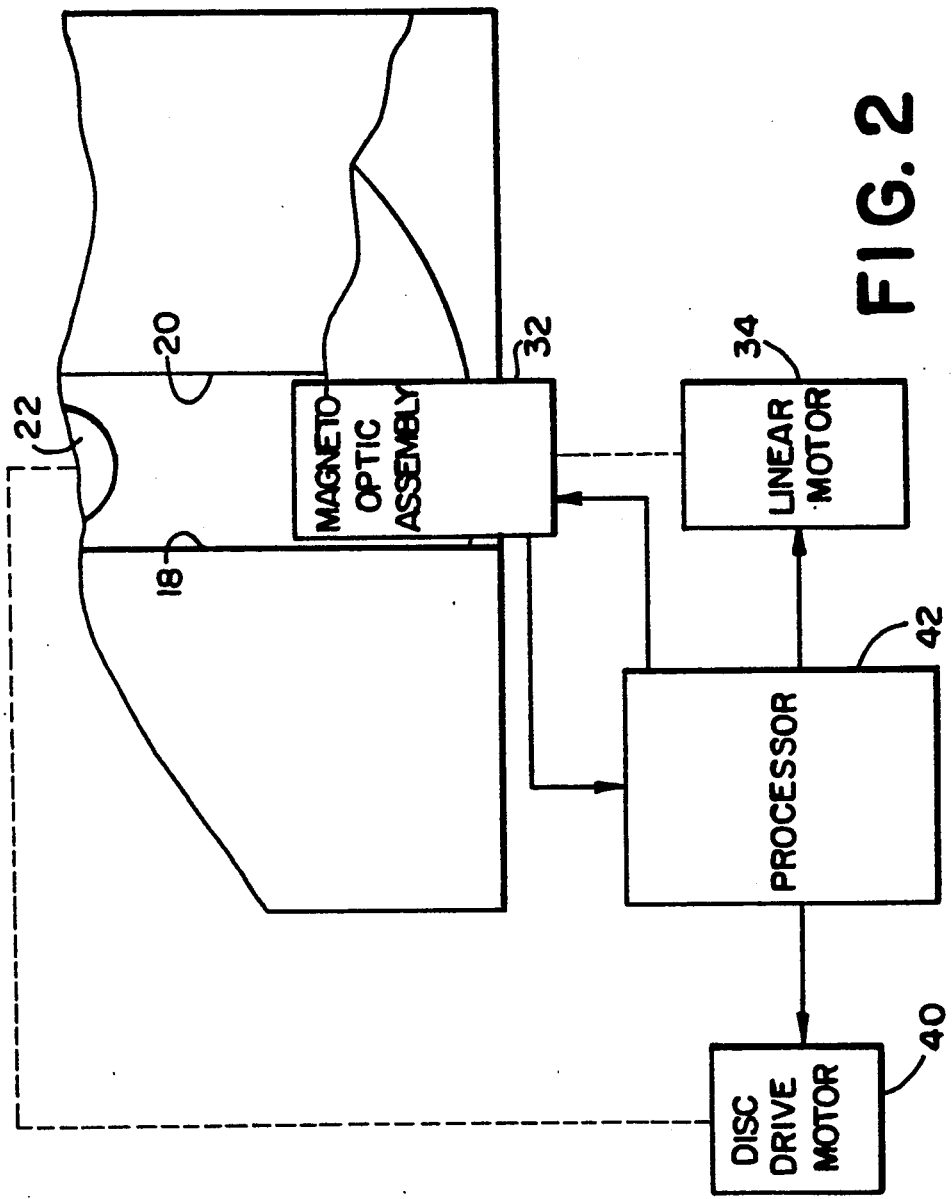
FIG. 2 is a diagrammatic view of the present invention.

Consider now the magneto-optical information storage system shown diagrammatically in FIG. 2. Disc drive motor 40 causes disc 20 to rotate. Such rotation is initiated by an appropriate enabling signal from processor 42. As disc 20 is rotating, processor 42 provides an enabling signal to linear motor 34 causing magneto-optical head assembly 32 to move radially across the surface of disc 20. Magneto-optical head assembly 32 illuminates a limited area on disc 20 with a beam of light, in a manner to be described hereinafter, in response to a further enabling signal from processor 42. Information stored on disc 20 modulates the light reflected off or from the surface of disc 20. This reflected light is detected and converted into an electrical signal of magneto-optical head assembly 32 and, it is this electrical signal which is provided to process 42.

In the preferred embodiment, the conversion of the reflected light into an electrical signal is accomplished by way of a differential detection scheme. It will be recalled that light either reflected from or transmitted through a magneto-optic disc at a point where information has been written will have a slightly different polarization than the light being focused onto the media. This change in polarization of the reflected or transmitted light will be either clockwise or counterclockwise, depending on the orientation of the magnetic moment of the media at that point. By passing the reflected or transmitted light through a beamsplitter, detecting each of the split beams, and comparing these detected beams, it is possible to determine whether the reflected or transmitted light has had its polarization modified. Such a modification of the polarization plane would be indicative of the presence of a digital 1 stored on the disc at that point. Since this type of detection scheme has been described in reference to another magneto-optic device in Mansuripur, M. et al. "signal and noise in magneto-optical readout", Journal of Applied Physics, Vol.53 No. 6 (June 1982) pages 4485-4493, it will not be further detailed herein.

Figure 3:
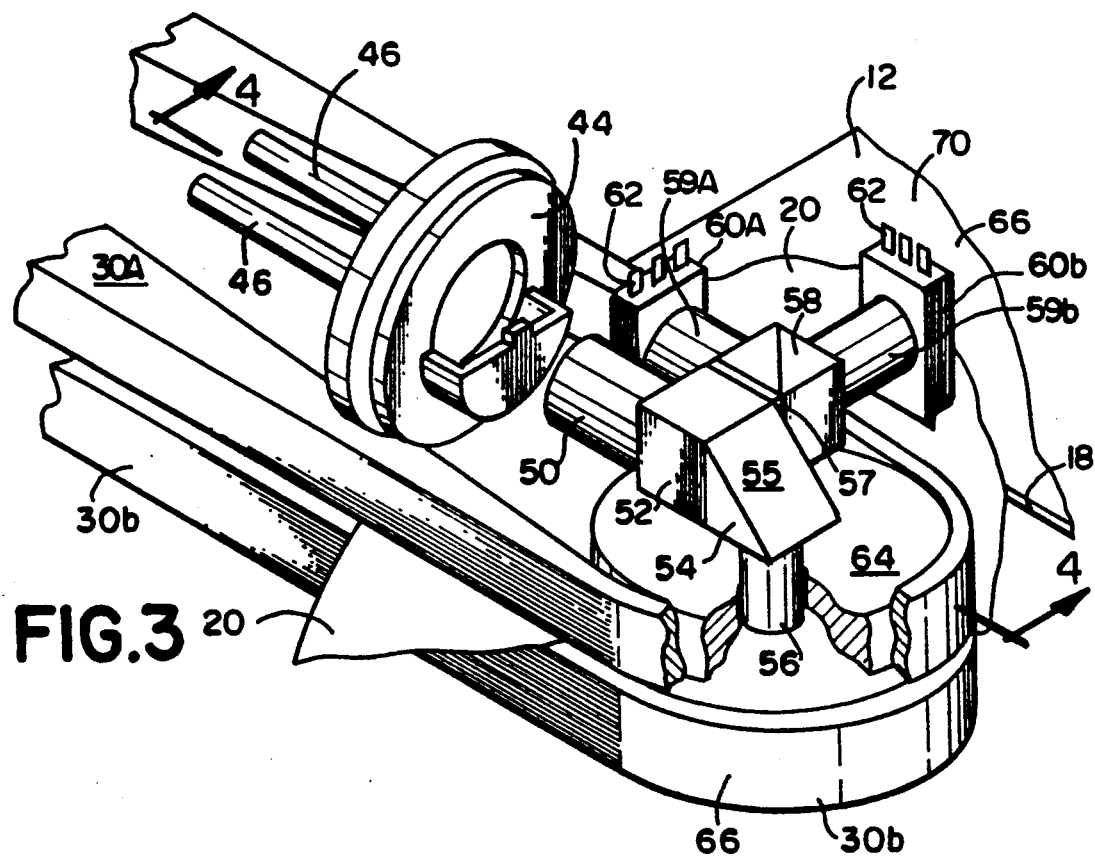
FIG. 3 is a perspective view of a portion of the magneto-optic information system shown in FIG. 1.

As shown in FIG. 3, cartridge 12 has been fully inserted and arm 30 has been extended such that the magneto-optical head assembly 32 has been moved radially across the surface of disc 20. It will be seen that arm 30 is split into upper arm half 30a and lower arm half 30b with disc 20 passing therebetween. Magneto-optical head assembly 32 is shown be split between arm halves 30a and 30b for supporting the optical and magnetic portions of the head assembly. Consider first the optical portion of the head assembly supported by arm half 30a, wherein there is shown laser diode 44 having leads 46. Although not shown, it will be understood that leads 46 are electrically connected to processor 42 for operation in any one of several known ways. Laser diode 44 serves as a source of light. As used herein the term light is meant to include both visible, and invisible light or more precisely electromagnetic radiation. particularly, the term light or electromagnetic radiation is meant to include that light having a wavelength in the range from 200 to 2000 nanometers (nm).

Figure 4:
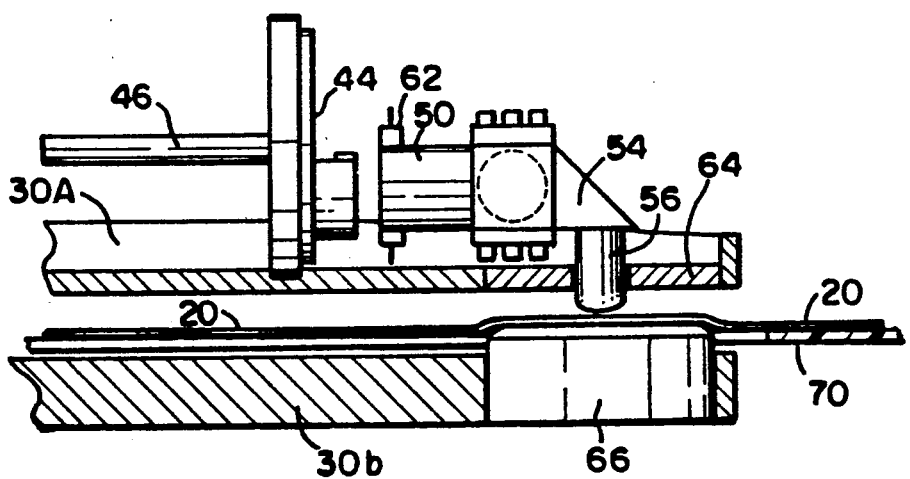
FIG. 4 is a section view along the line 4—4 of FIG. 3.

As shown in FIGS. 3 and 4, the light emitted from laser diode 44 is passed through and collimated by lens 50. When this light is passed through polarizing beamsplitter 52, whereupon it is presented to prism 54 and reflected off or from mirror surface 55 towards, or in the direction of disc 20. In the preferred embodiment, lens 50 is a gradient index lens. The light which is reflected by prism 54 is then passed through lens 56, which focusses the light onto the surface of disc 20. Unlike previous magneto-optical information storage systems, lens 56 is not mounted in a fashion so as to be moved relative to arm 30. In this regardless 56 is stationary in relation to arm 30. Light reflected off or from the surface of disc 20 is then again collimated by lens 56, passed through prism 54, and reflected by the mirror surface contained in beamsplitter 52. Since light is being reflected off or from the surface of disc 20, detection will be dependent upon the Kerr effect. The light reflected from the media, termed the "read beam," has two possible orientations of the polarization plane, depending on its orientation of the magnetic moment of the reflection point on the media. Each of these orientations of the reflected light has it's plane of polarization rotated by a few degrees with respect to the plane of the illuminating beam's polarization. The read beam is recollimated by objective lens 56 and reflected by prism 54 back toward beam splitter 52. In the preferred embodiment, beamsplitter 52 is a leaky polarizing beamsplitter which will not only reflect the polarization component of the read beam which has been created by the rotation effect of the media, but which will also reflect a certain amount of the larger polarization component of the light which is in the original plane of the illuminating beam. Consequently, the part of the read beam reflected by beamsplitter 52 is an essentially constant fraction of the total intensity of the read beam incident on beamsplitter 52, but the rotational difference between the two possible polarization orientations is exaggerated. The read beam passes next through halfwave plate 57 to beam splitter 58, a polarization beamsplitter which splits the light into two component beams to be focused by lenses 59a and 59b onto detectors 60a and 60b, respectively. In the preferred embodiment, lenses 56 and 59a and 59b are also gradient index lenses. Half wave plate 57 serves as a rotator to rotate the polarization planes of the read beam approximately 45°, adjusted so on average the intensities of the reflected and transmitted beams exiting beamsplitter 58 are equal. In the preferred embodiment, lenses 56 and 59a and 59b are gradient index lenses.

While detectors 60a and 60b can be of several different types, one detector used is the model IT338, manufactured and sold by Sony Corporation. Such a detector serves to detect discern both data as well as tracking information. Detectors 60a and 60b, in turn generate electrical signals reflective or indicative of the detected data and tracking information. These signals are then transmitted along leads 62 to processor 42. As previously explained, the signals from each of the detectors are compared in processor 42 in order to determine if any difference exists between the signals. The difference between the two signals is an indication of the magnetic domain polarity and hence the logic state stored at the reflection point on disc 20. For example, a positive difference is an indication of a digital 1 being stored at that point, while a negative difference is an indication of a digital 0 being stored at that point.

The signals from the detectors not only serve to provide the accessed information, but also allow processor 42 to evaluate the tracking information and supply the appropriate signals to linear motor 34 for moving arm 30 in a manner so that optical head 32 can be radially positioned over and follow a desired track on disc 20. Lens 56 is securely mounted in support disc 64 which, in turn, is securely mounted in arm half 30a.

A magnetic head 66 is securely fastened in lower arm half 30b. By moving media between magnetic head 66 and lens 56, information can be magnetically recorded on disc 20 at those points heated by the light which is focused by lens 56.

Lens 56 and magnetic head 66 are capable of stationary mounting in arm 30 due to the elimination by the present invention of the need to dynamically focus the light emitted from diode 44. The need to dynamically focus this light has been eliminated as a result of the degree of stabilization provided to disc 20 and the predictability of the distance between disc 20 and lens 56 during operation. Such stabilization and predictability comes from two sources, namely from plate 70 provided in the preferred embodiment in cartridge 12 and from magnetic head 66. Plate 70 provides primary stabilization while magnetic head 66 affords secondary stabilization of the media. The surface of plate 70 which faces disc 20 is a Bernoulli surface which serves to create and maintain an air bearing between the disc and plate 70. The structural features which result in the creation of this air bearing by the Bernoulli surface are known and will not be repeated herein. However, the adoption of such phenomena to optical information storage systems in order to eliminate the need for dynamically focusing light onto the disc is not known. As used herein, the term "air bearing" signifies the phenomenon of Bernoulli stabilization, wherein the optical media is attached toward a Bernoulli surface and stabilized.

Although plate 70 in the preferred embodiment is shown to be an integral part of cartridge 12, in an alternative configuration, plate 70 can be physically attached to drive 10. In this alternative design, cartridge 12 is appropriately modified, allowing plate 70 to be positioned proximate disc 20. Consequently, once cartridge 12 has been fully inserted into drive 10, the operation of the Bernoulli surface of plate 70 in providing the primary stabilization of disc 20 is essentially identical to that described above.

While not shown it will be understood that an opaque cover member may be provided over optical head assembly 32 in order to block out stray light as well as to protect optical head assembly 32 from the surrounding environment as well as dust.

Although disc 20 has been primarily stabilized by the air bearing created by plate 70, it will be recalled that magneto-optical head assembly 32 is accessing disc 20 through opening 18. Opening 18 is also present in plate 68. In the region within opening 18, there is no stabilization of disc 20. Consequently, magnetic head 66 serves to provide local secondary stabilization in the area surrounding lens 56 by creating and maintaining an air bearing which serves to hold that portion of disc 20 passing over magnetic head 66 in a close and, as will be described, predictable relationship thereto. Although the details of the structure contained in magnetic head 66 for achieving the creation of an air bearing have been described in U.S. Pat. No. 4,414,592 - Losee et al. the adoption of such phenomena to magneto-optical information storage systems in order to eliminate the need for dynamically focusing light onto the disc is not known.

Figure 5:
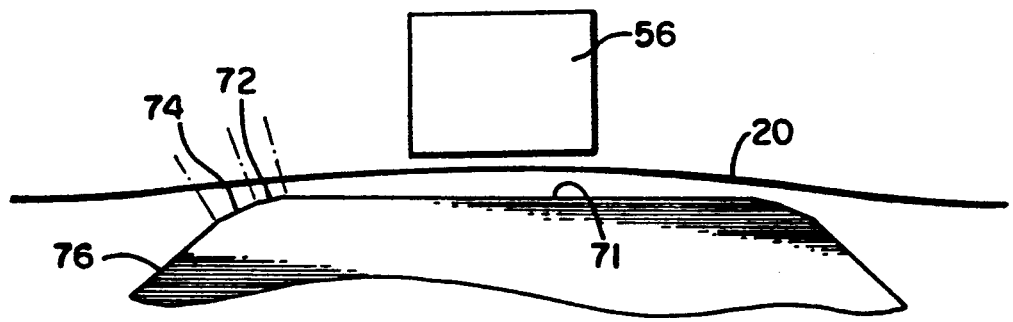
FIG. 5 is an enlarged view of a portion of the coupler shown and magnetic head in FIG. 3.

Referring to FIG. 5, the surface of magnetic head 66, as shown in FIG. 4, creates and maintains an air bearing between magnetic head 66 and disc 20. In the preferred embodiment the distance "A" between head and disc is approximately five to ten microns plus or minus 0.50 microns. There are a number of alternative head shapes and designs which are capable of providing the requisite Bernoulli stabilization of the media. In one such design, this relationship between magnetic head 66 and disc 20 is achieved by providing magnetic head 66 with a substantially flat surface 71 surrounding lens 56 (not and a series of increasingly steeper surfaces adjoining surface 71. It will be noted that in FIG. 5 that such surfaces may not be easily distinguished and a certain degree of exaggeration of the arcuate shaped surfaces is necessary. In the preferred embodiment, surface 72 is an arcuate surface formed as having an arc radius of 500 mm, surface 74 is also an arcuate surface having an arc radius of 270 mm and surface 76 is a generally flat surface formed at an angle of 45° with surface 71. Although not shown in FIG. 5, a similar means of secondary stabilization can be provided for the optical head assembly. In particular, stabilization may be achieved around lens 56 by creating a similar set of arcuate shaped surfaces for support disc 64 surrounding lens 56. It is within the scope of the present invention to provide such stabilization on both magnetic head 66 and disc 64.

It is important to note that the structures of magnetic head 66 and disc 64 could be used to stabilize either rotating flexible discs, such as disc 20, or tape forms of magneto-optical media. This structure is necessary only to achieve and maintain an air bearing between the magnetic head or the disk and the media that is either being rotated, moved linearly past the magnetic and optical heads, or helically scanned by a rotating drum, in geometries known in magnetic data recording technology. Furthermore, it may not be necessary to provide plate 70 for Bernoulli stabilization of a rotating disc. Indeed, such stabilization is not necessary for tape media. Therefore, the present invention is applicable to both flexible magneto-optical discs and tape.

Since the surface of disc 20 is stabilized at a relatively fixed distance,, from magnetic head 66, it is possible, for the first time, to operate the magneto-optical storage system so that the magneto-optical head is continuously focusing light onto the surface of disc 20. Consequently, information is stored on disc 20 by changing the orientation of the magnetic field of the magnetic recording element of magnetic head 66. Since magnetic head 66 is of a size used to magnetically record information on so-called floppy discs, the problem of relatively slow switching of magnetic field orientation, present in previous devices, has been eliminated.

Figure 6:
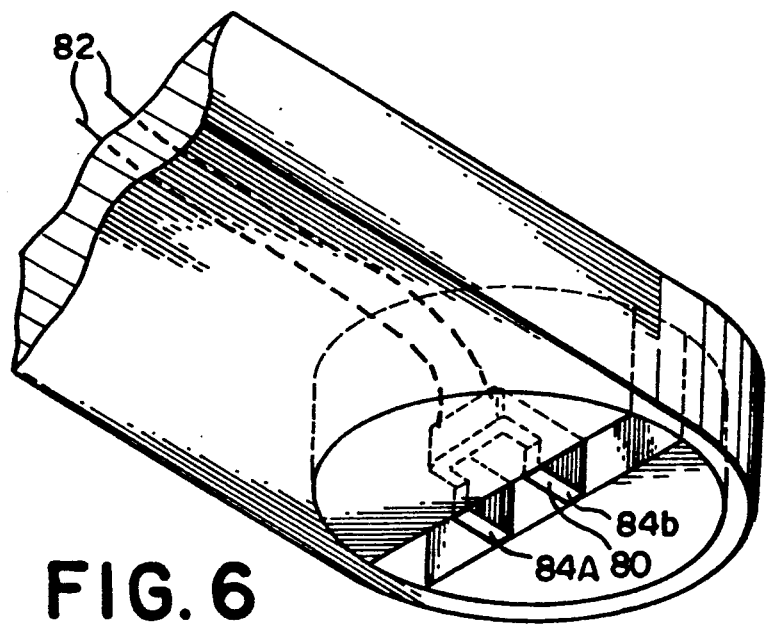
FIG. 6 is a side view of an alternate embodiment of the invention.

Referring to FIG. 6, there is shown an alternate embodiment of the magneto-optical head assembly. Rather than split arm 30 into upper and lower halves, it may be desirable to position the magnetic recording head and the optical head on the same side of disc 20. Since the object is to magnetically record in the same location, magnetic head 66 has been provided with a U-shaped magnetic element 80. Although not shown, it will be understood that magnetic element 80 is an electro-magnet which is given a magnetic field in accordance with an electrical signal provided on leads 82. Light to be focused onto the surface of disc 20 is directed between the arms 84a and 84b of element 80. The height of magnetic head 66 will have to be taken into account. That is, since the magneto-optical head will be slightly further away from disc 20, this distance will have to be taken into account when choosing lens 56.

Consider now the magneto-optical information storage system during write and read operations. During a write operation, information to be written on the flexible media is organized by processor 42 for sequential storage onto disc 20. A signal is generated by processor 42 which activates laser diode 44, assuming that processor 42 has determined, from the signals received from detectors 60a and 60b that the magneto-optical head assembly is positioned over a desired track on disc 20. With laser diode 44 activated, the information to be written is stored on disc 20 by varying the orientation of the magnetic field of magnetic head 66 in a known manner. Since disc 20 is heated at the point where light from laser diode 44 is focused, the poles located within that heated area on the media will assume the orientation of the magnetic field produced by head 66. Such reorientation of poles on disc 20 will continue until processor 42 has written all of the information to be stored. It will, of course, be understood that, while this write operation is taking place, disc 20 is spinning about hub 22 and linear motor 34 is moving arm 30 in such a fashion so as to move magneto-optical head assembly 32 radially across disc 20 also in response to signals from processor 42.

During the read operation, light from laser diode 44 is focused, onto the surface of disc 20. It is not necessary, and in fact, it is preferred, that the power associated with the read light be such that any heating of disc 20 by the light is minimal. Light reflected from the surface of disc 20 passes through the magneto-optical head in the manner already described and results in a series of electrical signals being generated and provided to processor 42. Processor 42 determines the difference between the signals from detectors 60a and 60b and uses this result to determine the presence of a logic 1 or a logic 0 stored on disc 20. Basically, if processor 42 determines a difference in these signals from detectors 60a and 60b, there is a logic 1 present on the media. If there is no difference between the signals, then a logic 0 is present on the media.

While the invention has been described and illustrated with reference to specific embodiments, those skilled in the art will recognize that modification and variations may be made without departing from the principles of the invention as described herein above and set forth in the following claims.

For example, in one alternative configuration (not shown), linear actuator motor 34 may be replaced by a rotary actuator motor. Such a device would move across the surface of disc 20 in a fashion which is similar to the motion of the tone-arm of a conventional phonograph. In such an embodiment, arm 30 and spicule member 28 would not have the shapes illustrated in FIG. 1, but rather, would be appropriately modified allowing accurate positioning and movement of magneto-optical head assembly 32 across the surface of disc 20.

What is claimed is:

1. An information read/write storage system for reading and writing data, comprising:
   flexible magneto-optical disk media having a coercive force, wherein data is written on and read from said flexible media;
   a magnetic recording means, having a recording head positioned proximate said flexible media, for recording information onto said flexible media at a point, said point being defined as the area of said flexible media wherein information is being recorded at any given time;
   an optical read and write means for providing a single focused beam of light onto said flexible media for reading and writing data from and to said flexible media, for receiving light reflected from said flexible media in relation to said single focused beam of light during a reading operation and for continuously providing said single focused beam of light onto said flexible media for continuously heating said point to reduce said coercive force during a writing operation while said magnetic recording means is recording; and
   Bernoulli stabilization means, positioned proximate said flexible media and connected to said magnetic recording means, for providing Bernoulli stabilization to said flexible media in the immediate region of said point where said magnetic recording means is recording information onto said media, so that said magnetic recording means is kept substantially at a constant distance away from said media in order to write data onto said media, whereby the size of said recording head is minimized thereby maximizing the switching speed of said recording head, wherein the cross-section of said recording head and said Bernoulli stabilization means facing said point is flat.

2. The system of claim 1, wherein said optical read/write means comprises,
- a light source for providing light of a type suitable for reading and writing information onto said flexible media;
- a lens for focusing said light from said source onto said flexible media and for collecting reflected light from said flexible media; and
- detector means, positioned proximate said lens, for receiving said reflected light and generating an information signal in response to said reflected light.

3. The system of claim 2, further comprising, movement means, connected to said lens, for positioning said lens over said flexible media so that said light from said source is provided to said flexible media.

4. The system of claim 3, further comprising, directing means for directing light from said source to said lens and for directing reflected light from said lens to said detector.

5. The system of claim 4, wherein said directing means comprises a beamsplitter.

6. An information read/write storage system for reading and writing data, comprising:
- flexible magneto-optical disk media having a coercive force, wherein data written on and read from said flexible media;
- a magnetic recording means, having a recording head positioned proximate said flexible media, for recording information onto said flexible media at a point, said point being defined as the area of said flexible media wherein information is being recorded at any given time;
- an optical read and write means for providing a single focused beam of light onto said flexible media for reading and writing for receiving light reflected from said flexible media in relation to said single focused beam of light during a reading operation and for continuously providing said single focused beam of light onto said flexible media for continuously heating said point to reduce said coercive force during a writing operation while said magnetic recording means is recording; and
- Bernoulli stabilization means, positioned proximate said flexible media and connected to said magnetic recording means, for providing Bernoulli stabilization to said flexible media in the immediate region of said point where said magnetic recording means is recording information onto said media so that said magnetic recording means is kept substantially at a constant distance away from said media in order to write data onto said media, wherein said Bernoulli stabilization means comprises a body member having a first flat surface, said first flat surface lying in a plane generally parallel to said flexible media, and said body member having a second surface extending away from said first surface outside of said plane so that Bernoulli stabilization of said flexible media in the area of said first surface is caused when said media is moving relative to said first surface, whereby the size of said recording head is minimized thereby maximizing the switching speed of said recording head wherein the cross-section of said recording head and said Bernoulli stabilization means facing said point is flat.

7. The system of claim 6, wherein said Bernoulli stabilization means has an aperture located in said flat surface and wherein said magnetic recording means comprises an electromagnet positioned within said aperture.

8. The system of claim 7, wherein said electromagnet comprises first and second arms and wherein said focused beam of light is directed through between said arms and onto said flexible media.

9. A method for reading and writing data, comprising the steps of:
- providing a flexible magneto-optical disk media having a coercive force;
- continuously focussing a single light beam onto a point on said media, for continuously heating said point to reduce said coercive force during a writing operation while;
- recording information onto said media at said point by applying a magnetic field to said point using a magnetic recording means, said magnetic recording means comprising a recording head;
- providing Bernoulli stabilization to said flexible media by positioning said Bernoulli stabilization means in the immediate region of said point of said flexible media and connecting said Bernoulli stabilization to said magnetic head so that said magnetic recording means is kept substantially at a constant distance from said media in order to write data onto said media, whereby the size of said recording head is minimized thereby maximizing the switching speed of said recording head, wherein the cross section of said recording head and said Bernoulli stabilization means facing said point is flat;
- receiving a light reflected from said media in relation to said focussed beam of light to perform a reading step.

* * * * *